Figure 3:
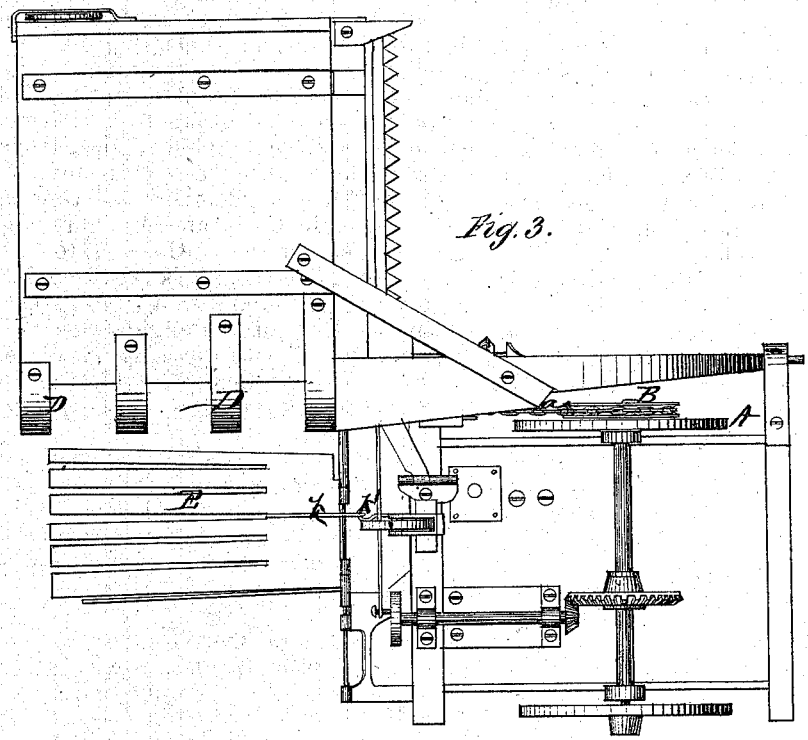

I. HEDGES.
Improvement in Harvester-Droppers.
No. 115,199.  Patented May 23, 1871.
2 Sheets--Sheet 1.
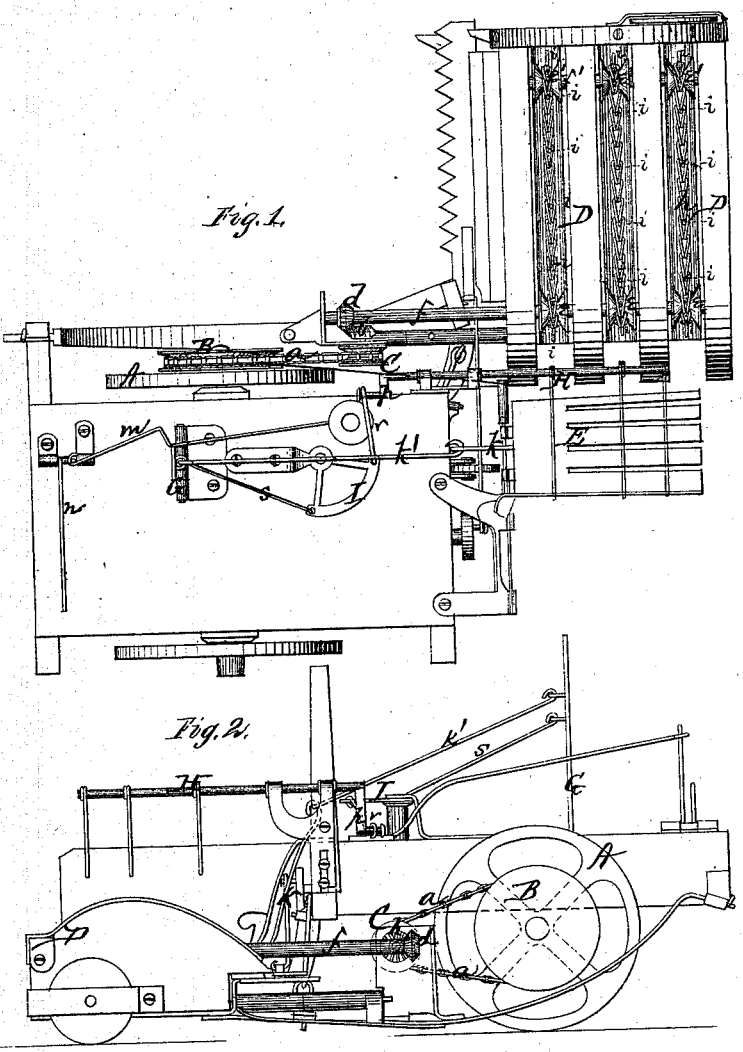

I. HEDGES.
Improvement in Harvester-Droppers.

No. 115,199. Patented May 23, 1871.

Witnesses
John A. Ellis.
J. P. White.

Inventor
Israel Hedges
Per,
J. H. Alexander
Atty

UNITED STATES PATENT OFFICE.

ISRAEL HEDGES, OF RADNOR, OHIO.

IMPROVEMENT IN HARVESTER-DROPPERS.

Specification forming part of Letters Patent No. 115,199, dated May 23, 1871.

*To all whom it may concern:*

Be it known that I, ISRAEL HEDGES, of Radnor, in the county of Delaware and State of Ohio, have invented certain new and useful Improvements in Reaping-Machines having Side-Delivery Droppers; and I do hereby declare that the following is a full, clear, and exact description thereof, reference being had to the accompanying drawing and to the letters of reference marked thereon, which form a part of this specification.

In order to enable others skilled in the art to which my invention appertains to make and use the same, I will now proceed to describe its construction and operation, referring to the annexed drawing, in which—

Figure 1 is a plan view; Fig. 2, a side elevation.

As I do not claim any improvement on the cutting mechanism of the reaper, I have not deemed it necessary to represent or describe any part thereof.

A represents one of the driving-wheels, on the side of which is a pulley, B, said pulley being connected, by a chain or belt, $a$, with a pulley, C, mounted at a suitable point on the frame which carries the reaper-platform D. On the same shaft as the pulley C is a small bevel-gear, $b$, which engages a bevel-pinion, $d$, on a shaft, $f$, said shaft having suitable bearings on the platform D at the inner end thereof. This platform is made of slats, as shown in Fig. 1, the shaft $f$ passing underneath the same, and pulleys $e\ e$ on the shaft are arranged so as to be between the slats of the platform. The pulleys $e\ e$ are, by chains $h\ h$, connected with similar pulleys $e'\ e'$ on another shaft, $f'$, at the other end of the platform. These chains are provided with pins $i\ i$ projecting upward, as shown. Thus, when the machine is in motion, there is a series of endless chains running parallel with the cutter-bar, which chains carry the grain into a box, the bottom E of which is hinged at its inner end. A rod, $k$, is attached to the under side of the bottom E, and passes up around the inner hinged end of the same, and is then, by another rod, $k'$, connected with a lever, G, hinged to the reaper-frame. A spring, $m$, holds this lever in proper position to bring and retain the bottom E in a horizontal position, and thus allows the grain conveyed by the chains $h\ h$ to accumulate on the same. As soon as enough grain has been collected for one sheaf a trigger or tripping-lever, $n$, connected with the spring $m$, is raised, which removes the spring from the lever G, when the platform E at once drops, depositing the sheaf on the ground. This movement of the lever G backward at the same time throws a cut-off, H, in the shape of a rake, against the inner end of the platform D, to hold the grain until the bottom E is raised again. The cut-off H is provided with a crank, $p$, connected, by a rod, $r$, with an angular lever, I, and this, by a rod, $s$, with the lever G. When the lever G is thrown forward again to raise the bottom E the cut-off H is turned away from the platform D.

I am aware that a cut-off and dropper have heretofore been simultaneously operated by means of a hand-lever; and such, broadly, I do not claim, as my invention relates to the special arrangement of operating-lever which I have described.

I claim—

1. The spring $m$, lever G, rods $k\ k'\ r\ s$, angular lever I, cut-off H, and dropper E, all combined and arranged for joint operation, substantially as and for the purpose set forth.

2. In combination with the above, tripping-lever $n$, substantially as and for the purpose described.

In testimony that I claim the foregoing as my own I affix my signature in presence of two witnesses.

ISRAEL HEDGES.

Witnesses:
WM. H. PRICHARD,
E. ABBOTT.